C. J. MANNING.
PRESSURE GAGE.
APPLICATION FILED JAN. 28, 1920.

1,372,182. Patented Mar. 22, 1921.

Inventor:
COLEMAN J. MANNING.
Attys.

UNITED STATES PATENT OFFICE.

COLEMAN J. MANNING, OF MEDFORD, MASSACHUSETTS.

PRESSURE-GAGE.

1,372,182. Specification of Letters Patent. Patented Mar. 22, 1921.

Application filed January 28, 1920. Serial No. 354,624.

*To all whom it may concern:*

Be it known that I, COLEMAN J. MANNING, a citizen of the United States, residing at Medford, in the county of Middlesex and State of Massachusetts, have invented new and useful Improvements in Pressure-Gages, of which the following is a specification.

This invention relates particularly to a pressure gage, the registering mechanism of which includes a pointer-carrying arbor, and torque-transmitting connections between said arbor and the means directly actuated and moved by variations of pressure, said connections including small toothed gear members such as a pinion on the arbor, and a toothed sector meshing with said pinion.

In another application filed by me May 8, 1919, Serial No. 295,674, I disclose as a means directly acted on by a medium whose variations of pressure are indicated, a fixed cylinder in the gage casing, a piston which is movable in one direction in said cylinder by increments of pressure, and in the opposite direction by a spring, the piston being connected by torque-transmitting means with the pointer-carrying arbor, and operating the latter and the pointer without objectionable vibration or fluctuation of the pointer, so that the pointer is free from lost motion or uncertain vibration, and always indicates exactly the degree of pressure.

The present invention has for its object to provide certain improvements in a gage of the character above indicated, said improvements relating to the means for moving the piston in the opposite direction to that imparted by the fluid pressure, to the means for preventing leakage of the fluid into the casing of the gage, and for frictionally resisting the movements of the piston, and to the construction of the gage casing, whereby its strength is increased.

The invention is embodied in the improvements which I will now proceed to describe and claim.

Of the accompanying drawings forming a part of this specification,—

The same reference characters indicate the same parts in all of the figures.

Figures 1, 2, 3, 4, 5, 6:
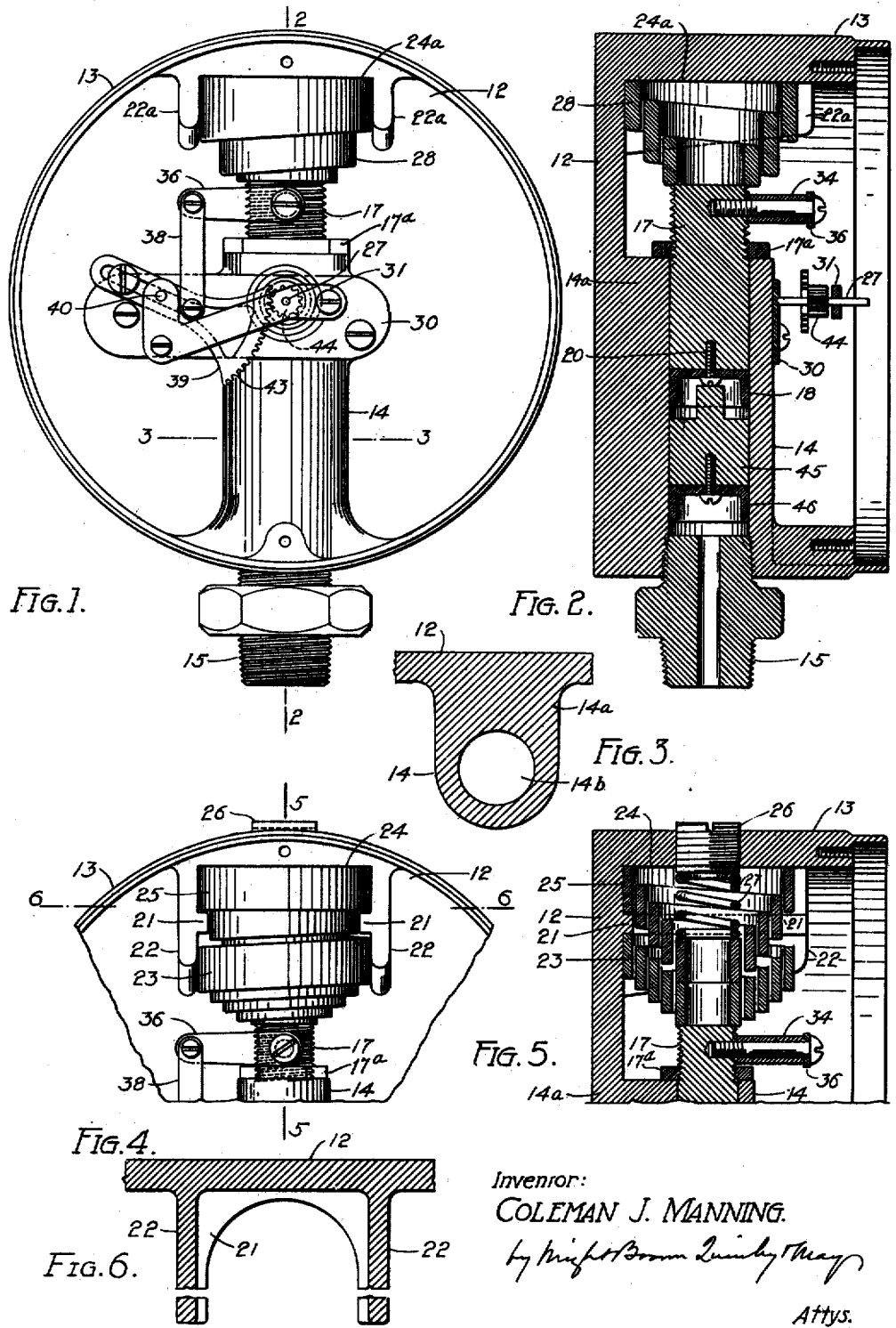
Figure 1 is a front elevation of a pressure gage embodying the invention, the dial and pointer being removed.
Fig. 2 is a section on line 2—2 of Fig. 1.
Fig. 3 is a fragmentary section on line 3—3 of Fig. 1.
Fig. 4 is a fragmentary front elevation, showing means for installing a plurality of springs.
Fig. 5 is a section on line 5—5 of Fig. 4.
Fig. 6 is a section on line 6—6 of Fig. 4, the spring being omitted.

The casing of the gage as here shown includes a back 12, and a circular wall 13. 14 represents a cylinder projecting from the casing wall at one side of the center of the casing, and provided at one end with means, such as an externally-threaded nipple 15, for connection with a liquid conduit. The opposite end of the cylinder opens into the casing. 17 represents a piston having a close sliding fit in the cylinder, and adapted to be moved therein in one direction by pressure of liquid in the cylinder, the piston being provided with a cup washer 18 of leather, or other suitable material, secured by a screw 20, and having a liquid-tight fit on the interior of the cylinder. The piston is provided with an adjustable stop nut 17$^a$ which limits the movement of the piston by the spring hereafter described.

The piston is formed to project from one end of the cylinder into the casing, the outer end of the piston being adapted to coöperate with the spring or springs hereinafter described, which act to move the piston in the opposite direction.

One feature of my invention resides in means provided as next described, whereby either one spring or a plurality of springs, may be supported by the casing and act on the piston.

To this end I provide the casing with a fixed inner abutment, adapted to support a direct-acting spring 23, which is interposed between said abutment and the upper end of the piston 17. The inner abutment is preferably formed by ribs or ears 21, 21, projecting inwardly from spaced apart flanges 22, 22, which may be cast integral with the casing. The spring 23 is preferably of volute form, its outer convolution resting on the ears 21, and its inner convolution on the piston 17. The perimeter of the outer convolution may bear on the inner sides of the flanges 22, the spring being slidable between said flanges to and from its operative position.

24 represents a fixed abutment for an auxiliary spring 25 of volute form, the abutment 24 being a flat surface formed on the interior of the casing wall 13, and adapted to support the outer convolution of the spring 25, the inner convolution of said spring being formed to bear on the inner convolution of the direct-acting spring 23.

It will now be seen that the direct-acting spring 23 may constitute the sole means for exerting inward pressure on the piston 17, and that whenever it is desired to augment this pressure, the auxiliary spring 24 may be employed.

To compensate for loss of power of the said spring or springs, due to the setting thereof, I provide compensating means comprising an abutment 26, adjustably connected with the casing, and a helical compensating spring 27 bearing at one end on said abutment. The opposite end of the spring 27 may bear on the auxiliary spring 25, as shown by Fig. 5, or on the direct-acting spring 23, in case the auxiliary spring is not employed. The abutment 26 is preferably a screw-threaded plug, engaged with a tapped orifice in the casing, and adapted to be rotated to increase or decrease the pressure of the compensating spring 27.

When the use of the compensating spring is not required, the abutment 26 is adjusted outwardly, until the compensating spring is inoperative.

In case it is found that when the fluid pressure is entirely removed from the piston 17, the gage pointer does not return exactly to zero, the error may be corrected by adjusting the abutment 26 inwardly until the pointer registers zero. The casing may be constructed as shown by Figs. 1 and 2, to permit the employment of a single spring 28, the casing being provided with an abutment 24ª and flanges 22ª to position said spring.

The casing may be provided with any suitable registering mechanism, adapted to be operated by movements of the piston 17, the registering mechanism here shown including an arbor 27 which carries the usual pointer, and is journaled in bearings in a fixed frame which, as here shown, includes a plate 30 attached to the cylinder 14, and a plate 31 attached to and spaced from the plate 30.

Torque is transmitted from the piston to the arbor by suitable connections, which may include a stud 34, attached to the piston, an arm 36 fixed to the stud 34, a link 38 pivoted to the arm 36, and a lever 39, fulcrumed at 40 on the frame above described, and pivoted to the link 38, a gear-toothed segment 43 formed on the lever 39, and a pinion 44 fixed to the arbor 27.

The piston 17 is considerably shorter than the cylinder 14, so that space is afforded in the cylinder between the piston 17 and the nipple 15, for a reception of a piston-shaped slug 45, having a close sliding fit in the cylinder and provided with a cup washer 46. One end of the slug 45 bears loosely on the piston 17. The slug 45 constitutes an additional safeguard against leakage of fluid into the casing, and may be inserted as a leakage preventative, in case it is found that the piston 17 and cup washer 18 are inadequate to prevent leakage.

As described in my above-mentioned pending application, the cup washer 18 constitutes a frictional retarding member, movable with the piston in frictional contact with the cylinder, whereby any spasmodic endwise movement of the piston and vibration of the registering mechanism is prevented, the pointer 28 coming to rest without fluctuation, after a change of position of the piston. The cup washer 46 on the slug constitutes an additional frictional retarding member, for the same purpose.

To strengthen the gage casing and prevent it from being distorted by the strains exerted thereon by the conjoint action of the piston and the spring or springs, I cast as an integral part of the casing a reinforcing boss or rib 14ª which joins the back 13, as shown by Figs. 2 and 3, and also joins the wall 13, as shown by Fig. 2. The outer portion of said boss is bored to form a cylindrical cavity 14ᵇ (Fig. 3), the portion of the boss having said cavity constituting the cylinder 14.

I claim:

1. A pressure gage comprising a casing, a cylinder within and rigid with the casing at one side of the center thereof, a piston movable in one direction in the cylinder by fluid pressure, a direct-acting spring adapted to move the piston in the opposite direction, and registering mechanism operable by the piston, the casing being provided with a fixed inner abutment adapted to support the direct-acting spring, and with a fixed outer abutment adapted to support an auxiliary spring in position to reinforce the direct-acting spring.

2. A pressure gage comprising a casing, a cylinder within and rigid with the casing at one side of the center thereof, a piston movable in one direction in the cylinder by fluid pressure, a direct-acting spring adapted to move the piston in the opposite direction, registering mechanism operable by the piston, the casing being provided with a fixed abutment, and the direct-acting spring being of volute form, and seated on said abutment, and means for compensating for loss of power of said spring through setting, said means comprising an abutment adjustably secured to the casing, and a helical spring supported by said abutment.

3. A pressure gage comprising a casing, a cylinder within and rigid with the casing at one side of the center thereof, a piston movable in one direction in the cylinder by fluid pressure, inner and outer abutments on the casing, each formed and arranged to support a volute spring in operative relation to said piston to move the latter in the opposite direction, a direct-acting volute spring interposed between said inner abutment and the piston, and an auxiliary volute spring interposed between the outer abutment and the direct-acting spring.

4. A pressure gage comprising a casing, a cylinder within and rigid with the casing at one side of the center thereof, a piston movable in one direction in the cylinder by fluid pressure, inner and outer abutments on the casing, each formed and arranged to support a volute spring in operative relation to said piston to move the latter in the opposite direction, an adjustable abutment on the casing, a direct-acting volute spring interposed between said inner abutment and the piston, an auxiliary volute spring interposed between the outer abutment and the direct-acting spring, and a compensating helical spring supported by the adjustable abutment.

5. A pressure gage comprising a casing, a cylinder within and rigid with the casing at one side of the center thereof, a piston movable in one direction in the cylinder by fluid pressure, and provided with a cup washer, a slug having a sliding fit in the cylinder between the piston and the fluid inlet of the cylinder, and provided with a cup washer, the slug being movable by fluid pressure with the piston and coöperating therewith in preventing leakage of fluid from the cylinder into the casing, and a spring seated on a fixed abutment in the casing, and adapted to move the piston in the opposite direction.

6. A pressure gage casing having an inwardly projecting cylinder rigid with the casing at one side of the center thereof, and two fixed spring abutments at the opposite side of the center, one of said abutments being arranged to support a direct-acting spring in position to coöperate with a piston in said cylinder, and the other abutment being arranged to support an auxiliary spring in position to reinforce the direct-acting spring.

7. A pressure gage casing having an inwardly projecting cylinder rigid with the casing at one side of the center thereof, a fixed spring abutment at the opposite side of the center, formed and arranged to support a spring in position to coöperate directly with a piston in said cylinder, and an adjustable spring abutment formed and arranged to support a helical compensating spring in position to act on said piston.

8. A pressure gage casing comprising a back, a circular wall integral with the back, a reinforcing boss integral with the wall and back and joined to the wall at one side of the center of the casing and projecting from the back into the casing, said boss being bored to form a cylinder which is open at one end, and a fixed spring abutment at the opposite side of the center of the casing, formed and arranged to support a spring in position to coöperate with a piston in said cylinder, the said boss being adapted to prevent distortion of the casing by strains exerted thereon by the conjoint action of the piston and spring.

In testimony whereof I have affixed my signature.

COLEMAN J. MANNING.